Nov. 12, 1935.　　C. E. WEXELBERG ET AL　　2,020,817
DELIVERY VEHICLE BODY CONSTRUCTION
Filed April 25, 1932　　2 Sheets-Sheet 1

INVENTORS
Clarence E. Wexelberg
George N. Lilygren
BY
Whittemore Hulbert Whittemore Belknap
ATTORNEYS

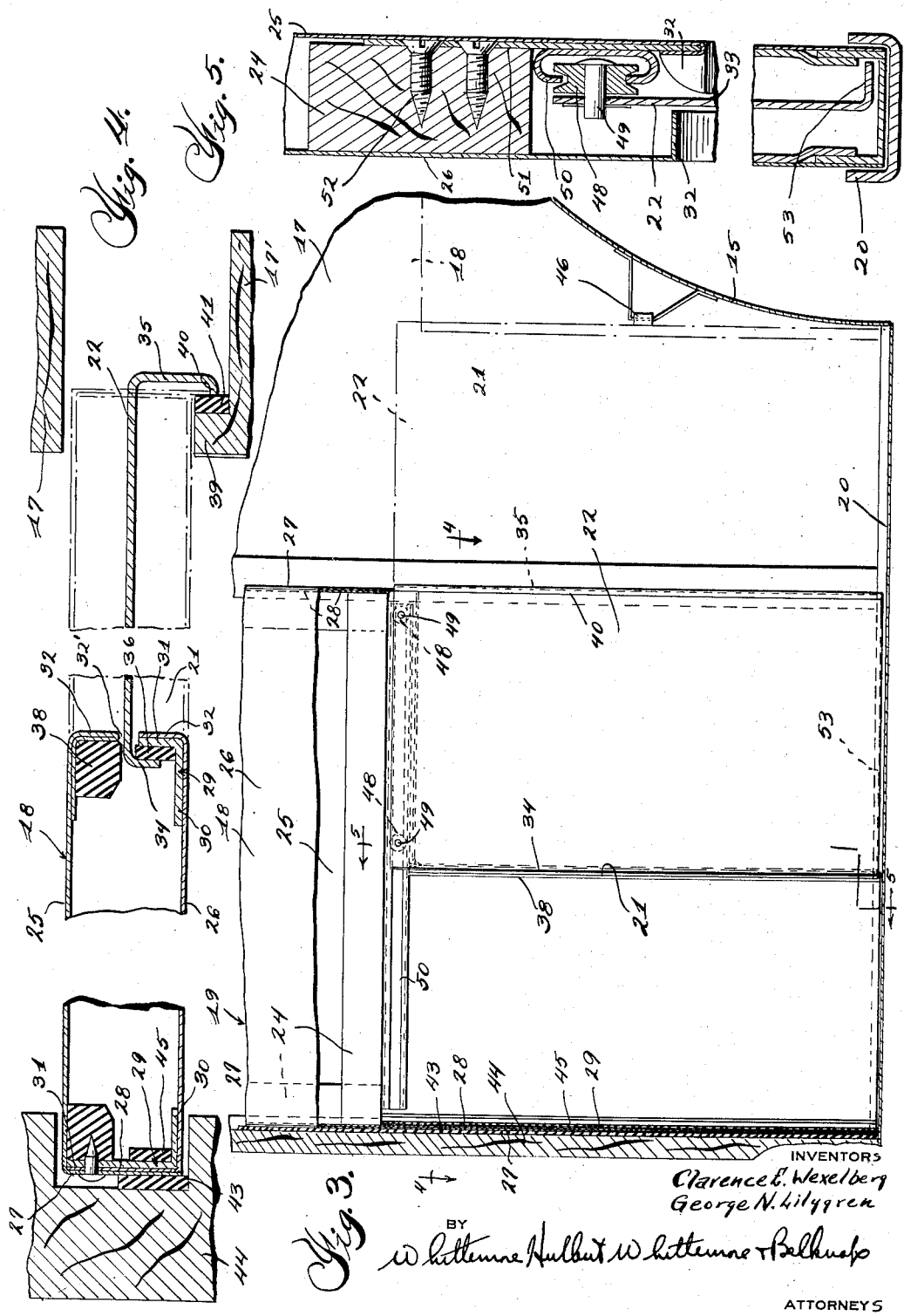

Patented Nov. 12, 1935

2,020,817

UNITED STATES PATENT OFFICE 2,020,817

DELIVERY VEHICLE BODY CONSTRUCTION

Clarence E. Wexelberg and George N. Lilygren, Detroit, Mich., assignors to Briggs Manufacturing Company, Detroit, Mich., a corporation of Michigan Application April 25, 1932, Serial No. 607,442

11 Claims. (Cl. 296—47)

This invention relates generally to vehicle body constructions and refers more particularly to improvements in bodies for motor delivery vehicles.

The present invention finds particular utility when employed in association with delivery bodies of the type having a platform intermediate the front and rear wheels depressed to substantially curb level so as to provide standing height clearance for the operator beneath a vehicle top of ordinary height. Delivery bodies affording the above advantageous feature have achieved considerable recognition in the trade for use on routes requiring frequent stops due to the facility with which it permits the operator to handle the load in the storage compartment of the vehicle and owing to the expedient manner in which the same permits the operator to enter and to leave the vehicle.

While the above features have been recognized by the trade, nevertheless, considerable difficulty has heretofore been experienced in providing relatively simple and inexpensive closures or doors for the low level driving compartment of the vehicle capable of being readily manipulated by the operator. Owing to the width of the driver's compartment necessary to provide the desired ready access thereto, swinging closures have been found impractical, and in relatively short wheel base vehicles wherein the space between the rear wheel housing and adjacent side of the driver's compartment is substantially less than the width of the door necessary for closing the compartment, serious complications have been experienced in attempting to provide a sliding door for the compartment.

It is therefore one of the principal objects of the present invention to provide improved sliding door constructions for the low level compartment of a vehicle wherein the space between the rear wheel housing and rear wall of the compartment is less than the width of the sliding door.

The novel construction of the door which permits its application to vehicles of the character set forth above will be made more apparent as this description proceeds, especially when considered in connection with the accompanying drawings, wherein:

Figure 3 is an enlarged side elevational view of the lower portion of the door with certain parts broken away for the sake of clearness;

Figure 4 is a cross sectional view taken on the line 4—4 of Figure 3;

Figure 5 is a longitudinal sectional view taken substantially on the line 5—5 of Figure 3.

Figure 1:
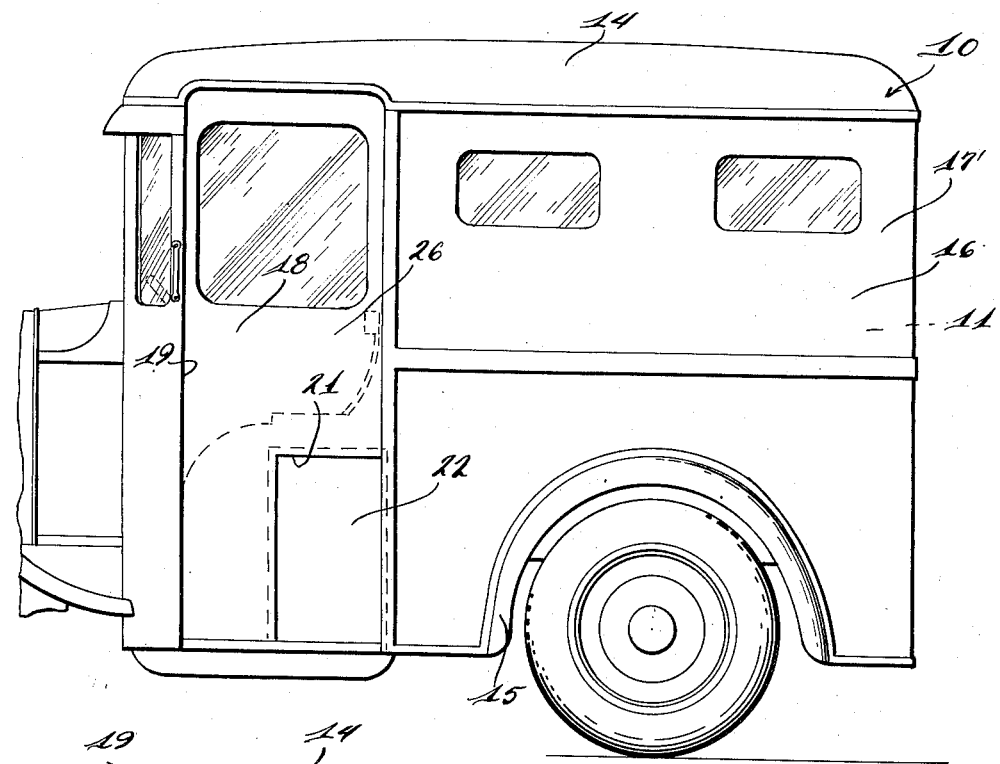
Figure 1 is a side elevational view of a vehicle having a low level platform in the driver's compartment and equipped with a sliding closure constructed in accordance with this invention.
Figure 2:
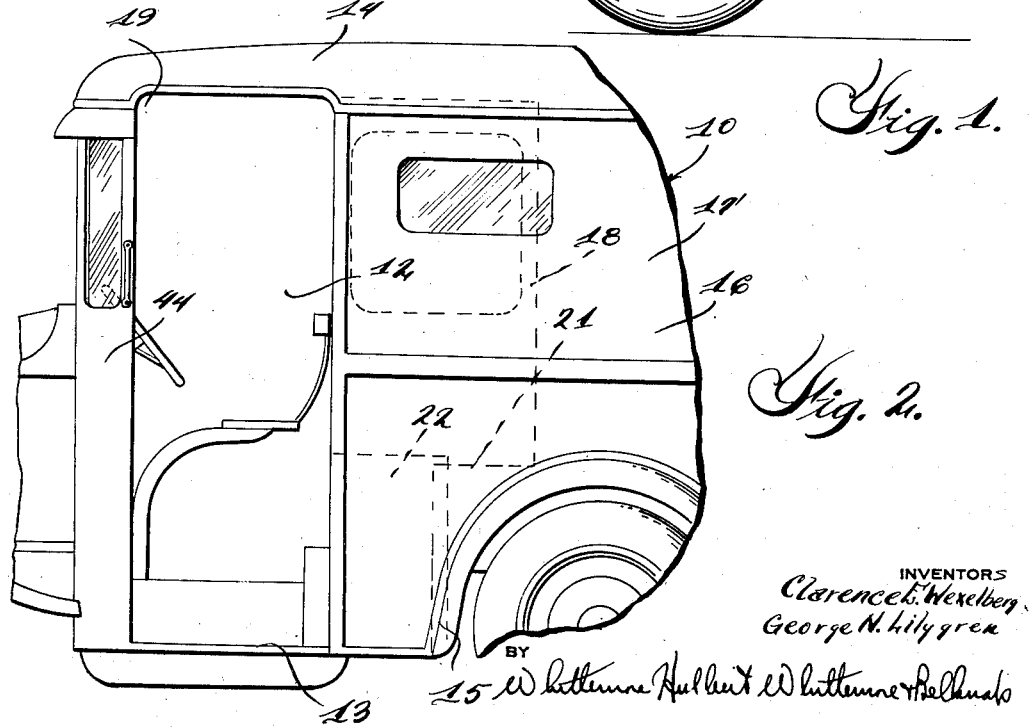
Figure 2 is a fragmentary view similar to Figure 1 showing the sliding closure in its open position.

Referring now more in detail to the drawings, it will be noted that there is fragmentarily illustrated in Figure 1 a motor delivery vehicle provided with a body 10 having a storage compartment 11 and having a driver's compartment 12 located in advance of the storage compartment. The driver's compartment 12 is provided with a transversely extending passage therethrough having flooring 13 arranged at a level so determined as to provide for standing height clearance within the driver's compartment beneath the top structure 14 of the body which is of ordinary height. In the present instance, the width of the body is substantially equal to the tread of the rear wheels of the vehicle so as to provide for obtaining maximum storage space in the compartment 11 and the rear wheels aforesaid are located within suitable wheel housings 15 extending inwardly from the opposite side walls 16 of the storage compartment. Each of the side walls 16 of the storage compartment are formed of inner and outer panels 17 and 17', respectively, spaced laterally from each other a sufficient distance to provide for receiving therebetween the sliding doors 18 for closing the openings 19 in the side walls of the driver's compartment opposite the transverse passage 12 therethrough. The door openings 19 in opposite sides of the driver's compartment extend from the top of the vehicle to the flooring 13 of the transversely extending passage so as to facilitate access to the vehicle, and the doors 18 are so constructed as to completely close these openings when slid to their forwardmost positions. The upper edges of the doors 18 are slidably supported by the top structure 14 in any suitable manner (not shown herein) while the lower edges of the doors are engageable within suitable channel-shaped tracks 20 embedded within the flooring 13. The foregoing construction is such as to provide for sliding movement of the doors from position thereof shown in Figure 1 to their open positions between the inner and outer side panels of the storage compartment as illustrated in Figure 2.

In the illustrative embodiment of the invention, the door openings 19 are relatively high so as to provide unobstructed access to the vehicle, and the space between the forward portions of the wheel housings 15 and rear sides of the door openings is substantially less than the width of the latter openings. Constructions of the foregoing character preclude the use of conventional sliding doors for the openings 19 since the wheel housings 15 would interfere with sliding movement of the doors to their full open position. However, it has been found by actual practice that sliding doors for use in association with vehicles of the above type are the most practical and efficient, and, accordingly, we have provided an improved sliding door construction capable of being moved rearwardly to expose the entire area of the openings 19 irrespective of the proximity of the wheel housing to the openings. In general, the foregoing is accomplished herein by cutting away the lower portion of the rear edge of the door as at 21 to provide a recess of sufficient dimension to receive the forward portions of the wheel housing when the door is moved to its open position as shown in Figure 2. The recess formed by cutting away the rear edge of the door as indicated above is normally occupied in the closed position of the door, illustrated in Figure 1, by an auxiliary sliding closure 22. The auxiliary closure 22 is associated with the door 18 in such a manner as to be automatically operated thereby, and, as a consequence, does not require any attention whatsoever on the part of the operator.

Inasmuch as the door openings in opposite sides of the driver's compartment are identical in construction, only one of the same will be described in detail herein. As shown particularly in Figure 4, the door 18 is composite in structure having a wooden frame 24 normally covered by inner and outer metallic panels 25 and 26, respectively. The front and rear edges of the inner panel 25 terminate in outwardly extending flanges 27 fashioned to telescopically engage similar flanges 28 extending inwardly from the front and rear edges of the outer panel 26. The flanges 27 and 28 are secured to suitable upright members 29 in the form of angle bars located between the panels 25 and 26. One of the flanges 30 of the angle bars embraces the inner side of the outer panel 26 and the other flanges 31 thereof form reinforcements for the flanges 27 and 28 on the aforesaid panels. The rear edges of the panels 25 and 26 defining the front side of the recess 21 in the body portion of the door are bent toward each other to form lateral flanges 32 as clearly shown in Figure 4 of the drawings. The flanges 32 are arranged in substantially the same vertical plane and terminate short of each other so as to provide a space 33 therebetween of sufficient dimension to receive the auxiliary closure 22. Thus, it will be observed that the auxiliary closure 22 telescopes the door 18 when the latter is moved to its opened position as shown in Figure 2.

The front and rear edge portions of the auxiliary closure 22 are bent outwardly to form flanges 34 and 35. The flange 34 is of greater width than the opening 31' in the body portion of the door through which the auxiliary closure extends so as to prevent disengagement of the latter from the former, and, in addition, is engageable with a resilient buffer 36 carried by the flange 32 on the outer panel 26. If desired, another buffer 38 may be secured to the panel 25 opposite the buffer 36 so as to cooperate therewith in forming a guide for the auxiliary closure upon movement of the same relative to the body portion of the door and to prevent any tendency for noises to develop upon vibration of the auxiliary door. The flange 35 on the rear edge of the auxiliary closure is of sufficient width to overlap an inwardly extending abutment 39 formed on the outer panel 17' of the storage compartment so as to form a seal therebetween. In detail, the outer edge of the flange is bent forwardly as at 40 for engagement with a suitable resilient buffer 41 secured to the rear side of the flange 39.

With the parts as thus far described and assuming that the same are in their position shown in Figure 2, it will be apparent that a forward pull on the body portion of the door 18 will cause movement of the latter forwardly relative to the auxiliary closure 22 until the front flange 34 on the closure is engaged by the resilient abutment 36 whereupon continued movement of the door 18 causes a corresponding movement of the auxiliary closure 22. When the door is in its forwardmost position, the front edge of the same engages a weather seal 43 secured to the inner surface of the body structure 44, and the flanges 34 and 35 similarly engage the resilient buffers 36 and 41. Thus, it will be seen that the closure 22 is not only automatically moved to its closed position upon prior manipulation of the door proper, but provision is made for securing an efficient weather seal between the door and associated parts of the body as well as between the various sections of the door.

Assuming now that the door is in its closed position as shown in Figure 1 and it is desirable to move the same to its open position illustrated in Figure 2, it will be noted that the auxiliary closure 22 will remain stationary until the door proper has been moved rearwardly to such an extent as to cause engagement of the flange 34 with a suitable resilient buffer 45 fixed to the angle bar 30, whereupon continued rearward movement of the door effects a corresponding movement of the auxiliary closure. The arrangement is such that by the time the auxiliary closure is moved rearwardly with the door, the former is located entirely within the latter so as to provide the necessary recess 21 for receiving the forward portions of the wheel housing 15. If desired, a suitable buffer 46 may be secured to the wheel housing 15 as shown in Figure 3 so as to engage the flange 35 on the auxiliary closure section and thereby prevent rattling of the same relative to the door proper.

As shown particularly in Figure 5, the auxiliary closure 22 is supported upon the door proper by suitable anti-friction means. In detail, a plurality of rollers 48 are journaled upon suitable pins 49 carried by the upper edge of the door and are fashioned for engagement with a suitable track 50 located between the panels 25 and 26 of the door and fixed to the latter. The track 50 is substantially channel-shaped in cross section and the base portion thereof is welded or otherwise suitably secured to a plate 51 which in turn is secured to the wooden frame structure 24 as at 52. The lower edge of the auxiliary closure is provided with an inwardly extending flange 53 terminating in close proximity to the adjacent side of the inner panel so as to cooperate with the inwardly extending flanges 32 on the outer panel to restrict lateral motion of the auxiliary closure relative to the door proper.

Thus, from the foregoing, it will be observed that we have provided an improved sliding door construction for vehicles of the type previously set forth wherein a portion of the space for receiving the door in the open position thereof is of less width than the actual width of the door. It will further be apparent that we have accomplished the foregoing result with a door assembly relatively simple in construction and capable of being readily manipulated by the operator.

What we claim as our invention is:

1. A delivery vehicle body having a wheel housing extending into the same and having an opening in one side wall thereof extending below the upper portions of the housing in advance of the latter, a sliding door for said opening having a recess in the rear edge thereof opposite the housing for receiving a portion of the latter upon sliding said door rearwardly to open position, and a sliding closure for said recess automatically operable upon manipulation of said door.

2. A delivery vehicle body having a wheel housing extending into the same and having an opening in one side wall thereof extending below the upper portions of the housing in advance of the latter, a sliding door for said opening having a recess in the rear edge thereof opposite the housing for receiving a portion of the latter upon sliding said door rearwardly to open position, a closure for the recess mounted for sliding movement relative to said door, and means upon said door engageable with the closure for automatically moving the latter to open and closed positions upon corresponding movement of the door.

3. A delivery vehicle body having a wheel housing extending into the same and having an opening in one side wall thereof extending below the upper portions of the housing in advance of the latter, a sliding door for said opening having a recess in the rear edge thereof opposite the housing for receiving a portion of the latter upon sliding said door rearwardly to open position and having laterally spaced inner and outer panels, and a closure for said recess slidable between said panels and having a lost motion connection with the door permitting predetermined sliding movement of the door relatively to the closure.

4. A delivery vehicle body having a wheel housing extending into the same and having an opening in one side wall thereof extending below the upper portions of the housing in advance of the latter, a sliding door for said opening having a recess in the rear edge thereof opposite the housing for receiving a portion of the latter upon sliding said door rearwardly to open position and having laterally spaced inner and outer panels, a closure for the recess in said door telescopically engaging the latter in the open position thereof, and a sliding connection between the door and closure for actuating the latter from the door.

5. A delivery vehicle body having a wheel housing extending into the same and having an opening in one side wall thereof extending below the upper portions of the housing in advance of the latter, a sliding door for the opening having a width greater than the distance between the wheel housing and rear edge of the door in its closed position and cut away opposite the wheel housing for receiving a portion of the latter upon movement of the door to its open position, and a movable closure for said cutaway portion actuated by the door and movable with the door during a part only of the movement thereof.

6. A delivery vehicle body having an opening in one side thereof, a sliding door for closing a portion of said opening, a closure forming an extension of the door to close the remaining portions of the opening and mounted upon said door for sliding movement in a rectilinear path relative thereto, and means carried by said door and engageable with said closure for automatically moving the latter to open and closed positions upon corresponding manipulation of the door.

7. A delivery vehicle body having an opening in one side thereof, a sliding door having a substantially rectangular cutaway portion for closing a portion of said opening and having laterally spaced inner and outer panels, a closure extending into said cutaway portion and forming an extension of the door to close the remaining portions of the opening and telescopically engaging said door between the aforesaid panels thereof, said door and closure having cooperating relatively movable abutments for moving the closure upon predetermined movement of the door.

8. A delivery vehicle body having an opening in one side thereof, a sliding door having a cutaway portion for closing a portion of said opening and having laterally spaced inner and outer panels, a closure extending into said cutaway portion and forming an extension of the door to close the remaining portions of the opening and telescopically engaging said door between the aforesaid panels thereof, and cooperating engageable members on the door and closure for automatically moving the latter to its open and closed positions upon corresponding manipulation of the door, said members forming a slidable connection between the door and closure.

9. A delivery vehicle body having a wheel housing extending into the same and having an opening in one side wall thereof extending below the upper portions of the housing in advance of the latter, a sliding door for the opening having a width greater than the distance between the wheel housing and rear edge of the door in its closed position, said door having laterally spaced inner and outer panels cut away opposite the wheel housing for receiving a portion of the latter upon movement of the door to its open position, a closure for the recess slidably mounted upon the upper edge of the recess and telescopically engaging said door between the side panels, and cooperating engageable means upon the door and closure for automatically moving the latter to open and closed positions upon corresponding movements of said door.

10. A delivery vehicle body having an opening in one side thereof, a sliding door for closing a portion of said opening, and a closure forming an extension of the door to close the remaining portions of the opening and mounted upon said door for rectilinear sliding movement relative thereto, said door and closure having a movable connection therebetween for moving the closure during a portion only of the movement of the door.

11. A delivery vehicle body having an opening in one side thereof, a door cut away at its lower rear edge for closing a portion of said opening, a closure mounted in said door for slidable movement into said cutaway portion and forming an extension of the door to close the remaining portions of the opening, means for sliding said closure relative to said door at predetermined intervals in the movement of said door, said means being positioned to permit free movement of the door relative to the closure during a portion of the travel of the door.

CLARENCE E. WEXELBERG.
GEORGE N. LILYGREN.